United States Patent
Cypher et al.

(10) Patent No.: US 8,103,834 B2
(45) Date of Patent: Jan. 24, 2012

(54) COHERENCE PROTOCOL WITH DYNAMIC PRIVATIZATION

(75) Inventors: Robert E. Cypher, Saratoga, CA (US); Haakan E. Zeffer, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 556 days.

(21) Appl. No.: 12/260,220

(22) Filed: Oct. 29, 2008

(65) Prior Publication Data

US 2010/0106912 A1    Apr. 29, 2010

(51) Int. Cl.
*G06F 12/00* (2006.01)

(52) U.S. Cl. .......................... 711/141; 711/146

(58) Field of Classification Search .................. 711/141, 711/146

See application file for complete search history.

(56) References Cited

U.S. PATENT DOCUMENTS 5,241,664 A * 8/1993 Ohba et al. ................ 711/121
2002/0133678 A1 * 9/2002 Mathews et al. ............ 711/153

OTHER PUBLICATIONS

Stenstrom, Per et al., "An Adaptive Cache Coherence Protocol Optimized for Migratory Sharing", pp. 109-118, Department of Computer Engineering, Lund University, 0884-7495/93, 1993 IEEE.

* cited by examiner

*Primary Examiner* — Hashem Farrokh
(74) *Attorney, Agent, or Firm* — Park, Vaughan, Fleming & Dowler LLP; Anthony Jones (57) ABSTRACT

Embodiments of the present invention provide a system that maintains coherence between cache lines in a computer system by using dynamic privatization. During operation, the system starts by receiving a request for a read-only copy of a cache line from a processor. The system then determines if the processor has privately requested the cache line a predetermined number of times. If so, the system provides a copy of the cache line to the processor in an exclusive state. Otherwise, the system provides a copy of the cache line to the processor in a shared state.

20 Claims, 6 Drawing Sheets

COHERENCE PROTOCOL WITH DYNAMIC PRIVATIZATION

BACKGROUND

1. Field of the Invention

The present invention relates to techniques for improving the performance of computer systems. More specifically, the present invention relates to a method and an apparatus for maintaining the coherence between cache lines in a computer system by using dynamic privatization.

2. Related Art

Computer systems often use a coherence protocol to ensure that copies of cache lines remain consistent. For example, one such coherence protocol is the "MESI" protocol. MESI is an acronym that represents the states in which a cache line can be held in a processor and/or in memory. The MESI states include "modified" (M), "exclusive" (E), "shared" (S), and "invalid" (I). (Note that although we describe systems which use the MESI protocol, there exist other coherence protocols that include some or all of the MESI states and which operate in a similar manner.)

A processor that contains a copy of a given cache line in the M state holds a current, valid copy of the cache line. For such a cache line, the copy of the cache line in memory is stale and no other processor holds a copy. Moreover, a processor that holds a cache line in the M state has both read and write permission for the cache line, so the processor can freely read from and write to the cache line.

A processor that contains a copy of a cache line in the E state holds a current, valid copy of the cache line. For such a cache line, the copy in memory is also a current, valid copy of the cache line. However, no other processor holds a copy of the cache line (i.e., the cache line is "privately" held). A processor that holds a cache line in the E state has read-only permission for the cache line, so the processor can freely read from the cache line, but cannot write to the cache line. In addition, a cache line in the E state can typically be silently evicted from the processor without requesting permission.

A processor that contains a copy of a cache line in the S state holds the current, valid copy of the cache line. The copy in memory is also a current, valid copy of the cache line. Additionally, one or more other processors in the system may also hold copies of the cache line in the S state. Note that a processor that holds a cache line in the S state has read-only permission for the cache line, so the processor can freely read from the cache line, but cannot write to the cache line. Moreover, a cache line in the S state can typically be silently evicted from the processor without requesting permission.

A processor that contains a copy of a cache line in the I state does not contain a valid copy of the cache line. However, valid copies of the cache line may exist in memory or in another processor. Moreover, a processor that holds a cache line in the invalid state has no read or write permission for the cache line, so the processor cannot read from or write to the cache line.

In a directory-based computer system that uses the MESI protocol, when a cache line in the E state is to be written, the cache line can be upgraded locally from the E state to the M state without making a request to the directory (i.e., the cache line can be "silently" upgraded). This is beneficial because it eliminates the latency and bandwidth required to request the upgrade from the directory.

However, supporting the E state in such a system can adversely affect performance when a processor R requests a line that is held in the E state by a different processor S, because a request must be sent from the directory to processor S, and processor S must provide the line to the directory (or directly to processor R) from its cache. Furthermore, in protocols that reduce directory bandwidth by not updating the directory during the eviction of a line in E state, it is possible that processor S will deny (i.e., not-acknowledge or "NACK") the request to forward the line to processor R (because processor S has evicted the line) which results in "four-hop" latency (i.e., a "four-hop miss") for processor R's request. Moreover, in a computer system that includes a large cache, maintaining cache lines that are accessed by multiple processors in the E state can be inefficient because the coherence protocol overhead involved in accessing cache lines is particularly high.

SUMMARY

Embodiments of the present invention provide a system that maintains coherence between cache lines in a computer system by using dynamic privatization. In some embodiments of the present invention, the system is computer system 100, which appears in FIG. 1A.

During operation, the system starts by receiving a request for a read-only copy of a cache line from a processor. The system then determines if the processor has privately requested the cache line a predetermined number of times. If so, the system provides a copy of the cache line to the processor in an exclusive state. Otherwise, the system provides a copy of the cache line to the processor in a shared state.

In some embodiments, when determining if the processor has privately requested the cache line, the system: (1) determines if the processor has received a copy of the cache line in the shared state and has upgraded the copy of the cache line from the shared state to the modified state; and (2) determines that no other processor has requested a copy of the cache line between when the cache line was received by the processor and when the cache line was upgraded by the processor.

In some embodiments, the system receives a request from a processor for a copy of a cache line in a writable state. The system then determines if the processor holds the only copy of the cache line in the shared state. If so, the system increments an upgrade counter in metadata in the cache line and then provides a copy of the cache line to the requesting processor in the modified state. Otherwise, the system reduces the upgrade counter for the cache line and then provides a copy of the cache line to the requesting processor in the modified state.

In some embodiments, upon evicting a cache line from a processor which is the only processor that holds a modified (i.e., "dirty") copy of the cache line and writing the cache line back to memory 108, the method further comprises updating a last-user pointer for the cache line to identify the processor as the last processor to request the cache line.

In some embodiments, when determining if the processor has privately requested the cache line a predetermined number of times, the system determines if the cache line is held by another processor in the shared state. If so, the system reduces the upgrade counter for the cache line and determines that the processor is not privately requesting the cache line. Otherwise, the system reads the last-user pointer for the cache line to determine if the processor was the last processor to request the cache line. If the processor was not the last processor, the system reduces the upgrade counter for the cache line and determines that the processor is not privately requesting the cache line. Otherwise, the system determines if the upgrade counter is greater than a predetermined threshold value. If so, the system determines that the processor is privately requesting the cache line. Otherwise, the system determines that the processor is not privately requesting the cache line.

In some embodiments, when reducing the upgrade counter for the cache line, the system sets the upgrade counter in metadata for the cache line to zero. In other embodiments, the system subtracts a predetermined value from the upgrade counter in metadata in the cache line.

In some embodiments, providing a copy of the cache line to the processor in the shared state involves providing the processor with a read-only copy of a cache line that can be held simultaneously by one or more other processors in the computer system in the shared state. In some embodiments, providing a copy of the cache line to the processor in the exclusive state involves providing the processor with a read-only copy of a cache line that is not held by any other processor in the computer system.

BRIEF DESCRIPTION OF THE FIGURES

Note that reference numerals refer to the same parts throughout the figures.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The methods and processes described below can be included in hardware modules. For example, the hardware modules can include, but are not limited to, microprocessors; memory chips; memory controllers; application-specific integrated circuit (ASIC) chips, field-programmable gate arrays (FPGAs), and other programmable-logic devices now known or later developed. When the hardware modules are activated, the hardware modules perform the methods and processes included within the hardware modules.

Terminology

Throughout the description, we use the following terminology in describing embodiments of the present invention. These terms are generally known in the art, but are defined below to clarify the subsequent descriptions.

The term "bandwidth" refers to the capacity of a communications link which carries communications between two or more devices. More specifically, the bandwidth of a communications link is the number of communications per second (or bytes per second) that can be transferred across the communication link.

When we refer to a processor 102 as "holding," "containing," or otherwise having a cache line, the cache line resides in a cache in the processor. For example, in the computer system 100 shown in FIGS. 1A-1B, the cache line can reside in L1 cache 104 in processor 102.

Cache Coherence Protocol

Embodiments of the present invention use a cache coherence protocol to ensure that copies of cache lines from a shared memory 108 (see FIGS. 1A-1B) remain consistent. For example, some embodiments of the present invention use the "MESI" protocol. MESI is an acronym that represents the states in which a cache line can be held in processor 102 (i.e., in an L1 cache 104 within a processor 102) and/or in memory 108. The states include "modified" (M), "exclusive" (E), "shared" (S), and "invalid" (I). (Note that although we describe embodiments of the present invention using the MESI protocol, embodiments of the present invention that operate with other coherence protocols function similarly.)

A processor 102 that contains a copy of a given cache line in the M state holds a current, valid copy of the cache line. For such a cache line, the copy of the cache line in memory 108 is stale and no other processor 102 holds a copy. Moreover, a processor 102 that holds a cache line in the M state has both read and write permission for the cache line, so the processor 102 can freely read from and write to the cache line.

A processor 102 that contains a copy of a cache line in the E state holds a current, valid copy of the cache line. For such a cache line, the copy in memory 108 is also the current, valid copy of the cache line. However, no other processor 102 holds a copy of the cache line (and hence the cache line is "privately" held). In addition, a processor 102 that holds a cache line in the E state has read-only permission for the cache line. Moreover, a cache line in the E state can typically be silently evicted from the processor without requesting permission.

A processor 102 that contains a copy of a cache line in the S state holds a current, valid copy of the cache line. The copy in memory 108 is also a current, valid copy of the cache line. Additionally, one or more other processors 102 in computer system 100 may also hold copies of the cache line in the S state. Moreover, a processor 102 that holds a cache line in the S state has read-only permission for the cache line. Furthermore, a cache line in the S state can typically be silently evicted from the processor without requesting permission.

A processor 102 that contains a copy of a cache line in the I state does not contain a valid copy of the cache line. However, valid copies of the cache line may be held in memory 108 or in another processor 102. Note that when a processor 102 holds no data in a given cache line (e.g., at startup), the cache line is in the I state. Moreover, a processor 102 that holds a cache line in the invalid state has no read or write permission for the cache line.

Under the MESI protocol, cache lines can be "upgraded" from one coherency state to another, less-restrictive coherency state. For example, the S coherency state can be upgraded to the M coherency state, thereby gaining write permission for the previously read-only cache line. In some coherency states, the upgrade requires that an upgrade request be made to directory 112, while in other coherency states, an upgrade can be made locally, without making a request to directory 112.

For example, because a processor 102 that holds a cache line in the S state is potentially one of several processors 102 that hold a copy of the cache line, the processor 102 must first request write permission for the cache line from directory 112 before upgrading the cache line from the read-only S state to the writable M state.

In contrast, because a processor 102 that holds the cache line in the E state is the only processor 102 that holds a copy of the cache line, the processor 102 can locally upgrade the cache line from the read-only E state to the writable M state without informing directory 112 (i.e., the processor can "silently" upgrade the cache line).

Computer System

Figure 1A:
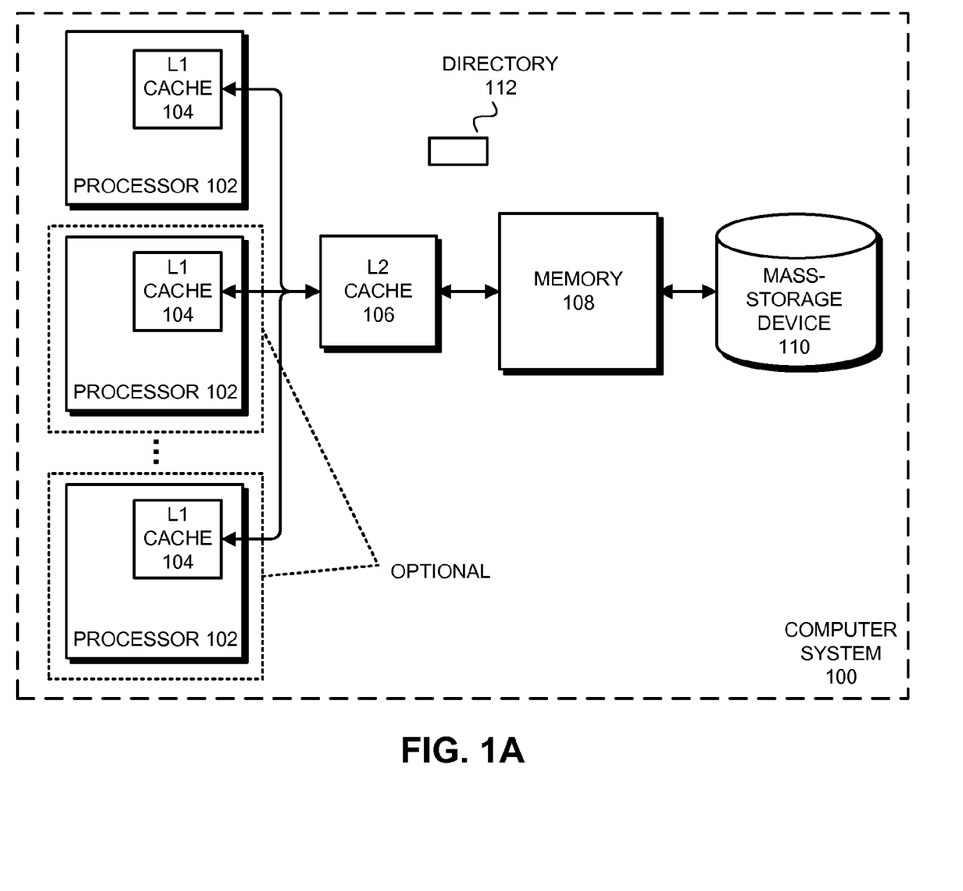
FIG. 1A presents a block diagram of a computer system in accordance with embodiments of the present invention.

FIG. 1A presents a block diagram of a computer system 100 in accordance with embodiments of the present invention. Computer system 100 includes processor 102, L1 cache 104, L2 cache 106, memory 108, mass-storage device 110, and directory 112.

Processor 102 can be a general-purpose processor that performs computational operations. For example, processor 102 can be a central processing unit (CPU), such as a microprocessor, a controller, or an application-specific integrated circuit. There are numerous possible CPU architectures (e.g., reduced instruction set computer (RISC), complex instruction set computer (CISC), superscalar, or multi-threaded) for processor 102. Such CPU architectures are well-known in the art and hence are not described in more detail.

As shown in FIG. 1A, in some embodiments of the present invention, computer system 100 optionally includes two or more processors 102. In these embodiments, each processor is a separate general-purpose processor that performs computational operations (as described above). In these embodiments, some or all of L2 cache 106, memory 108, directory 112, and mass-storage device 110 can be shared between the two or more processors 102. Such computer systems are known in the art and hence are not described in more detail.

In some embodiments of the present invention, each processor 102 is a multi-core processor that includes two or more separate processing cores integrated into a single semiconductor die (i.e., a chip-level multiprocessor). Alternatively, processor 102 can include two or more separate semiconductor dies, each including one or more processor cores integrated in one package. In these embodiments, each processor core within processor 102 functions as a separate general-purpose processor that performs computational operations. Thus, the cores may or may not each include a separate L1 cache 104, and can share some or all of L2 cache 106, memory 108, directory 112, and mass-storage device 110.

Figure 1B:
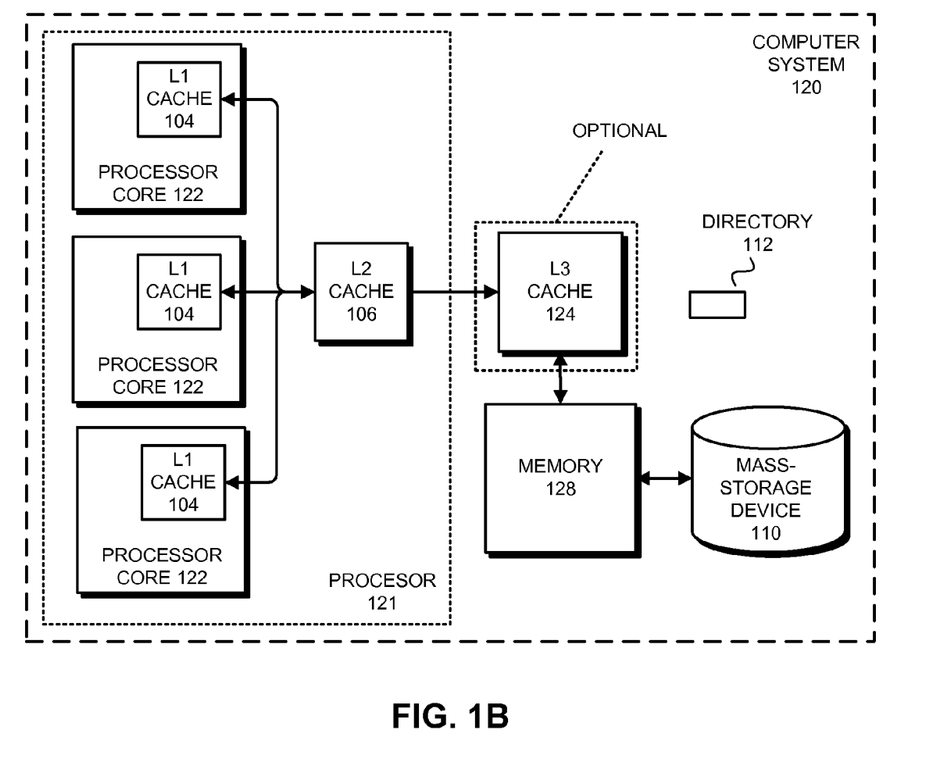
FIG. 1B presents a block diagram illustrating an exemplary computer system with multi-core processors in accordance with embodiments of the present invention.

FIG. 1B presents a block diagram illustrating an exemplary computer system 120 with multi-core processors in accordance with embodiments of the present invention. As can be seen in FIG. 1B, processor 121 includes a number of processor cores 122 that share L2 cache 106. In addition, such systems can optionally include higher-level caches, such as L3 cache 124. As described above, in some embodiments, two or more processors 121 can be included in computer system 120. Such computer systems are known in the art and hence are not described in more detail.

In the following description, we describe embodiments of the present invention using computer system 100 for clarity. However, these embodiments are operable using computer system 120 in the same fashion.

Mass-storage device 110 is a high-capacity, non-volatile computer-readable storage device, such as a disk drive or a large flash memory, with a large access time. Memory 108, L2 cache 106, and L1 cache 104 are computer-readable storage devices that collectively form a memory hierarchy that stores data and instructions for processor(s) 102. L1 cache 104, L2 cache 106, and memory 108 are small, fast memories that store copies of frequently used data. For example, memory 108 can be a dynamic random access memory (DRAM) structure that is larger than L1 cache 104 and L2 cache 106, whereas L1 cache 104 and L2 cache 106 can be comprised of smaller static random access memories (SRAM) or DRAMs. The memory hierarchy can be coupled by a communications link (e.g., a memory bus) that facilitates transferring communications and data between memory 108, L2 cache 106, directory 112, and processor 102/L1 cache 104. Such memory structures are well-known in the art and are therefore not described in more detail.

In embodiments of the present invention, L1 cache 104, L2 cache 106, and memory 108 are logically partitioned into a number of cache lines for storing data. Starting from memory 108 and proceeding to L1 cache 104 (right to left in FIGS. 1A-1B), at each level of the memory hierarchy, the number of cache lines is smaller than the number of cache lines at the next higher level.

Figure 2:
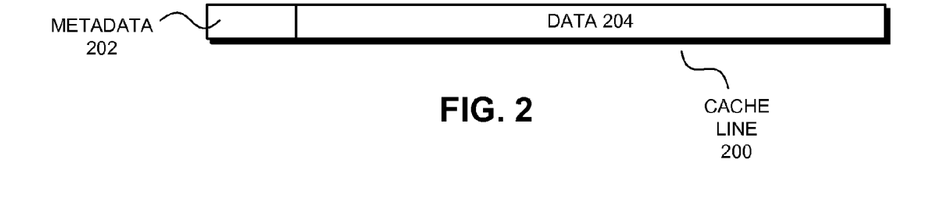
FIG. 2 presents an exemplary cache line in accordance with embodiments of the present invention.

FIG. 2 presents an exemplary cache line 200 in accordance with embodiments of the present invention. As can be seen in FIG. 2, cache line 200 includes metadata 202 and data 204. Data 204 is used to hold the cache line data. Metadata 202 is used by computer system 100 (e.g., directory 112, and the memory hierarchy) to record information about the cache line. For example, in some embodiments of the present invention, metadata 202 includes an "upgrade counter" that is used to record the number of times that the cache line has been privately requested (as is described in detail below). In addition, metadata 202 can include a MESI protocol state for the cache line and other information about the cache line.

In embodiments of the present invention, upon a request by processor 102, which originally held the only copy of a given cache line in an S state, to upgrade the cache line to the M state, directory 112 increments the upgrade counter in metadata 202 for the cache line and passes a copy of the cache line and the updated metadata 202 to processor 102. By incrementing the upgrade counter in this way, directory 112 records the fact that the requesting processor has "privately requested" the cache line. Note that passing the copy of the cache line to processor 102 in the M state involves invalidating the copy of the cache line in other processors in computer system 100 and in memory 108, so processor 102 must then maintain the metadata 202 (i.e., upgrade counter, etc.) along with the copy of the cache line.

Although not shown in FIGS. 1A-1B, in some embodiments of the present invention, computer system 100 includes one or more additional memory structures coupled to memory 108, including an additional L2 cache 106 and one or more L1 caches 104 in separate processors 102. In the embodiments of the present invention in which L3 cache 124 is used, these memory structures can additionally be coupled to L3 cache 124.

Figure 3A:
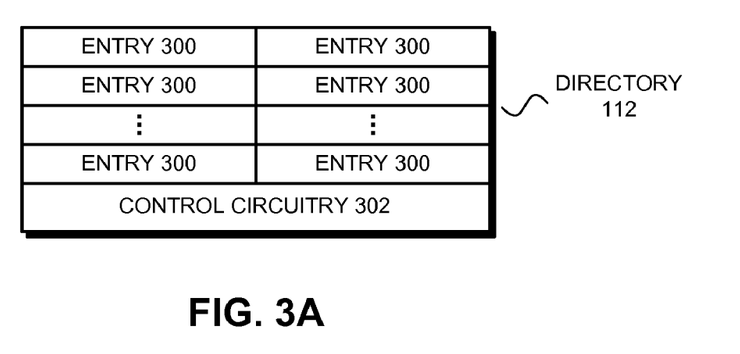
FIG. 3A presents a block diagram illustrating an expanded view of a directory in accordance with embodiments of the present invention.

Directory 112 is a circuit structure that keeps track of the status of cache lines in the memory hierarchy. FIG. 3A presents a block diagram illustrating an expanded view of directory 112 in accordance with embodiments of the present invention. As can be seen in FIG. 3A, directory 112 includes a number of entries 300 and control circuitry 302. Each entry 300 can hold a record for keeping track of the status of a corresponding cache line in the memory hierarchy. Control circuitry 302 controls the operation of directory 112 and handles communications between directory 112 and the processors 102 and the other elements in the memory hierarchy. For example, when the status of a cache line changes, control circuitry 302 updates the status of the cache line in the corresponding directory entry 300.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (e.g., a "smart phone"), a guidance system, a piece of audio-visual equipment, a toy, a control system (e.g., an automotive control system), or another electronic device.

Although we describe computer system 100 as comprising specific components, in alternative embodiments different components can be present in computer system 100. For example, in some embodiments, computer system 100 can include video cards, network cards, optical drives, and/or other peripheral devices that are coupled to processor 102 using a bus, a network, or another suitable communication link. In some embodiments, computer system 100 may not include some elements of the memory hierarchy (i.e., L2 cache 106, memory 108, and/or mass-storage device 110).

Directory

Figure 3B:
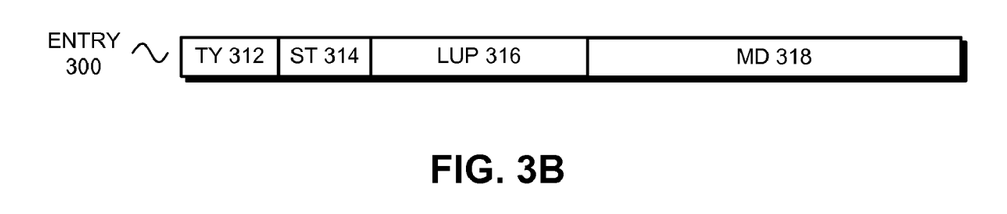
FIG. 3B presents a block diagram illustrating an exemplary format for a directory entry in accordance with embodiments of the present invention.

In embodiments of the present invention, each entry 300 in directory 112 includes a number of fields for recording the status of the cache line. For example, FIG. 3B presents a block diagram illustrating an exemplary format for a directory entry 300 in accordance with embodiments of the present invention. In the illustrated format, the entry 300 is configured to store information about a cache line that is not present in any cache in the system (i.e., only resides in memory 108). In these embodiments, the entry 300 can be used by directory 112 to track the last processor 102 that held the cache line by using the last-user pointer (LUP) 316. Table 1 describes the fields in entry 300 in FIG. 3B and their uses.

TABLE 1

Fields in Exemplary Directory Entry

| FIELD | USE |
| --- | --- |
| Type (TY 312) | A field that indicates how the entry is formatted. |
| Status (ST 314) | A field that contains the MESI protocol state of the cache line. |
| Last-User Pointer (LUP 316) | A field that contains the identity of the cache where the corresponding cache line resides. |
| Metadata (MD 318) | A field that optionally contains additional information about the cache line. |

Although we present one example of the formatting for a directory entry 300, in other embodiments of the present invention, the format of a directory entry 300 need not conform to the illustrated format. Generally, any type and arrangement of fields that are useful for recording the state of the cache line can be used. Further, the formatting of a given entry 300 can be changed dynamically by directory 112 to enable recording information about the cache line.

Note that although we present the last-user pointer 316 as being held in a field in an entry 300 in directory 112 for the corresponding cache line, in alternative embodiments, the last-user pointer 316 is located elsewhere. For example, in some embodiments of the present invention, last-user pointer 316 is stored in metadata 202 in the cache line.

In some embodiments of the present invention, when certain operations are performed which change the status of the cache line in a processor 102 and/or in memory 108, directory 112 updates a corresponding entry 300 within directory 112. For example, upon: (1) memory 108 providing a copy of a cache line to a processor 102 which was not previously listed in the directory as having a copy of the cache line; (2) a processor 102 or a cache notifying directory 112 that the status of a local copy of the cache line has been changed; (3) a cache line being written back to memory 108 by a processor 102 or a cache; or (4) certain operations being performed which change the status of a cache line, directory 112 updates a corresponding entry 300 in directory 112 to indicate a current MESI protocol status of the cache line. In addition, directory 112 can record other information about the cache line in the entry 300, such as the identity of the cache that contains a copy of the cache line, the last processor to hold the cache line, etc.

For example, when memory 108 provides a copy of a cache line to processor 102 in the M state, directory 112 updates an entry for the cache line to indicate that the cache line is contained in L1 cache 104 in processor 102 in the M state. In another example, upon writing back a modified (i.e., "dirty") cache line from the last processor 102 to hold a copy of the cache line to memory 108, directory 112 can update the last-user pointer 316 to contain the identity of the processor 102.

Although we describe embodiments of the present invention where state information is contained in directory entries 300 in directory 112, in some embodiments of the present invention, some or all of the state information for cache lines is instead contained in metadata 202 for each cache line in memory 108. In these embodiments, directory 112 can update metadata 202 in cache lines in memory 108 when the status of the cache line changes in a similar way to the way that directory entries 300 are updated. (Note that we describe embodiments of the present invention that use entries 300 in directory 112 for clarity.) In alternative embodiments, all of directory 112 can be stored as a separate structure in memory 108 (i.e., in DRAM).

Dynamically Privatizing Cache Lines

Embodiments of the present invention enable "dynamic privatization" of cache lines. Dynamic privatization involves detecting "private requests" for cache lines and then dynamically adjusting the protocol state in which cache lines are provided to requesting processors.

These embodiments monitor for "private requests" by detecting when a processor (e.g., processor 102) has: (1) requested a read-only copy of the cache line; (2) been provided a copy of the cache line in the S state; and (3) subsequently requested to upgrade the permissions for the cache line from the S state to the M state, without another processor requesting a copy of the cache line. Upon detecting that a processor has privately requested a given cache line a predetermined number of times, these embodiments provide subsequent copies of the cache line to processor 102 in the E state (i.e., a "private" state in which only one processor holds a copy of the cache line).

By dynamically privatizing the cache line in this way, these embodiments take advantage of the difference in communications that take place in the memory hierarchy for cache lines in the S and E states to avoid unnecessary traffic (in the form of requests, acknowledgements, etc.) in the memory hierarchy (i.e., on the memory bus). More specifically, recall that holding a cache line in the S state requires processor 102 to make a request to directory 112 before upgrading the cache line to the M state. On the other hand, holding a cache line in the E state enables processor 102 to upgrade the cache line without making a request to directory 112 (i.e., processor 102 can "silently" upgrade the cache line), but upon another processor requesting a copy of the cache line, a communication must occur between processor 102, directory 112, and possibly the other elements in the memory hierarchy.

Thus, if the cache line is not upgraded to the M state, receiving the cache line in the E state can involve more communication with directory 112 than if the cache line is received in the S state. However, if the cache line is upgraded to the M state, receiving the cache line in the S state can involve more communication with directory 112 than if the cache line is received initially in the E state. Embodiments of the present invention therefore reduce traffic in the memory hierarchy by initially providing the cache line in the S state, but determining when processor 102 is privately requesting a cache line and subsequently providing the cache line to processor 102 in the E state.

In comparison to existing systems, embodiments of the present invention incur less latency and consume less bandwidth on the memory bus. More specifically, by providing non-privately-requested cache lines in this way, these embodiments can reduce three-hop misses (due to not providing cache lines in the E state for non-private lines where no silent upgrade takes place). In addition, because E state cache lines can be silently evicted, the number of four-hop misses can be reduced. The reduction in latency and bandwidth consumption is particularly evident with large caches with high latency and bandwidth costs, such as the caches used in many existing computer systems.

Process for Dynamically Privatizing a Cache Line

Figure 4:
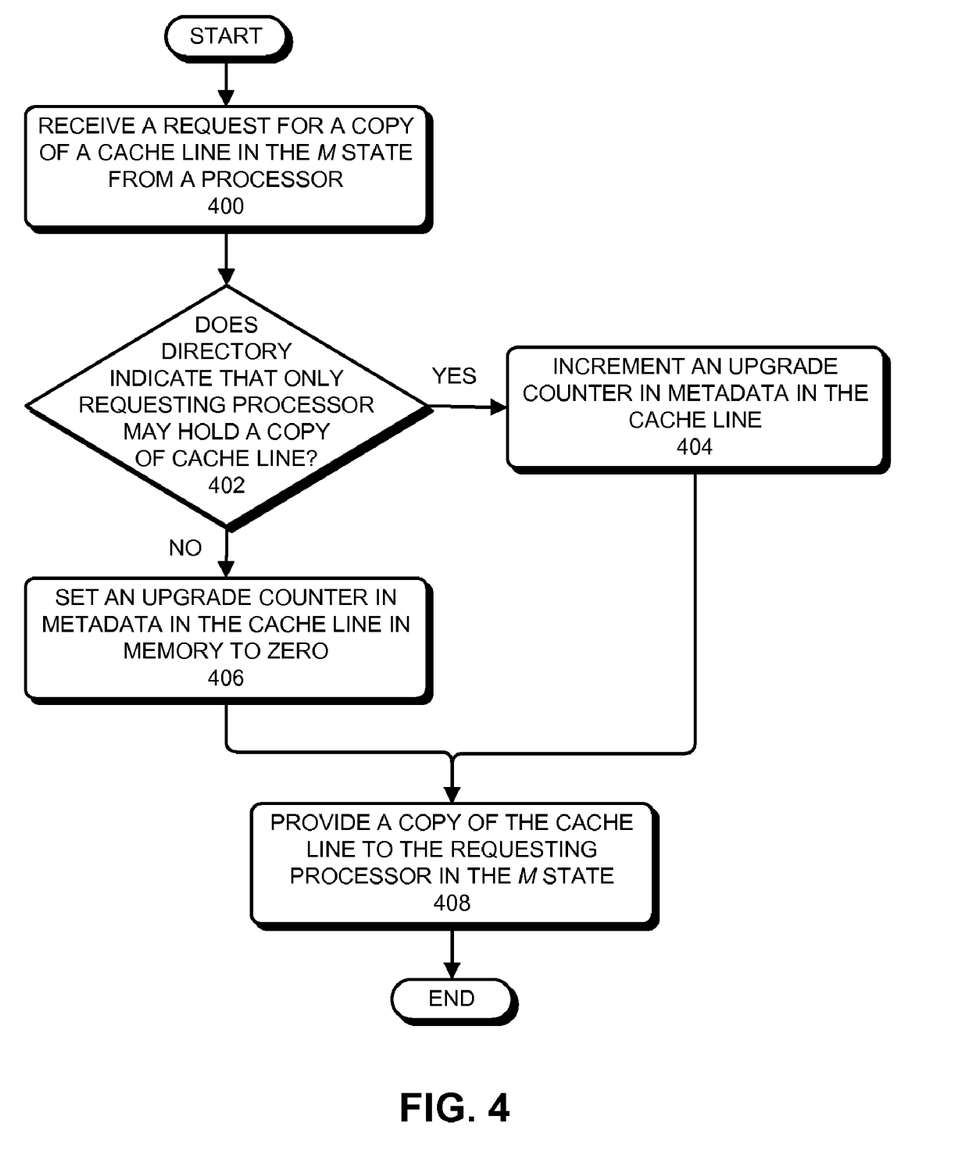
FIG. 4 presents a flowchart illustrating a process of incrementing an upgrade counter in accordance with embodiments of the present invention.
Figure 5:
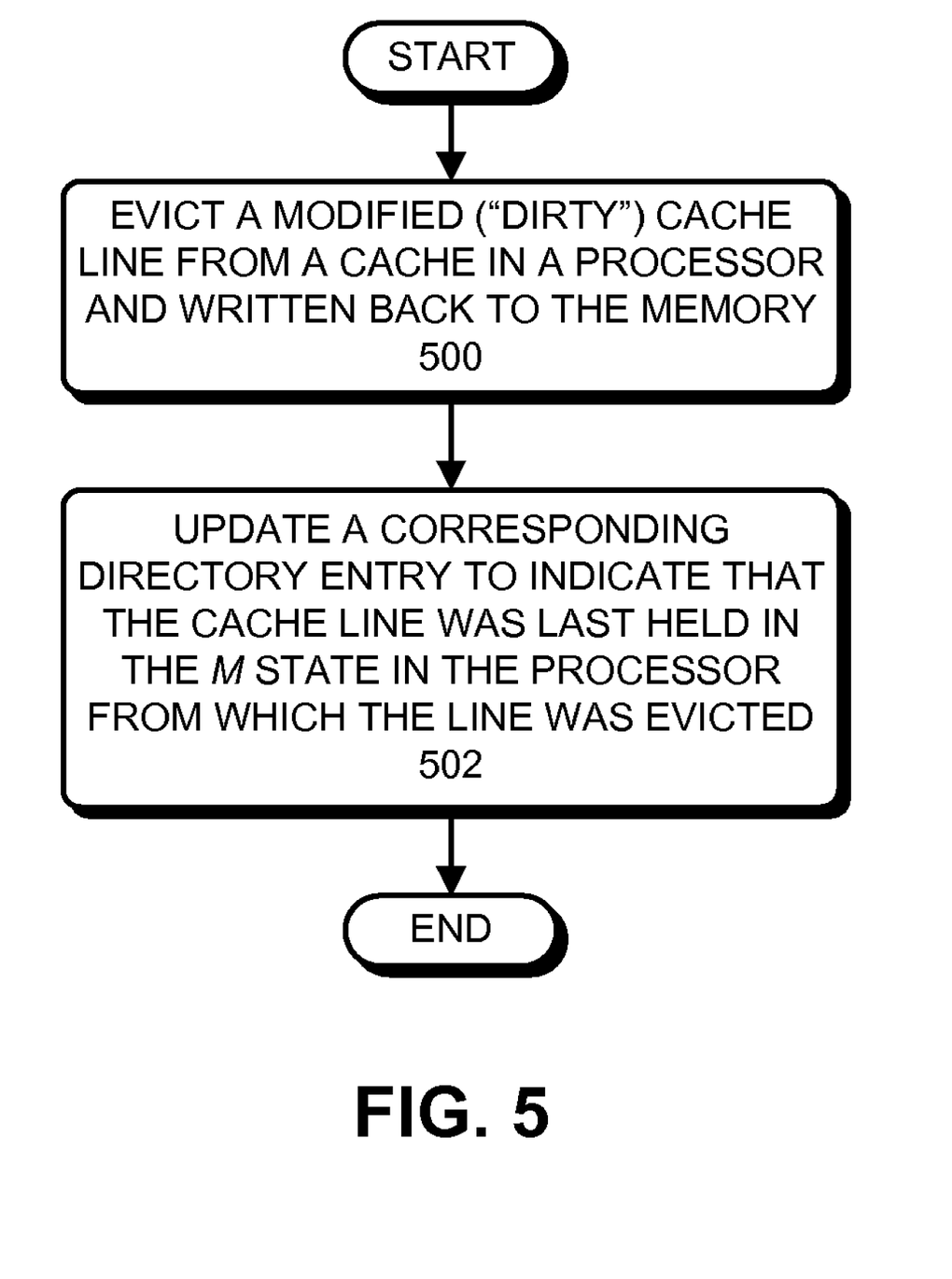
FIG. 5 presents a flowchart illustrating a process for updating a last-user pointer in accordance with embodiments of the present invention.
Figure 6:
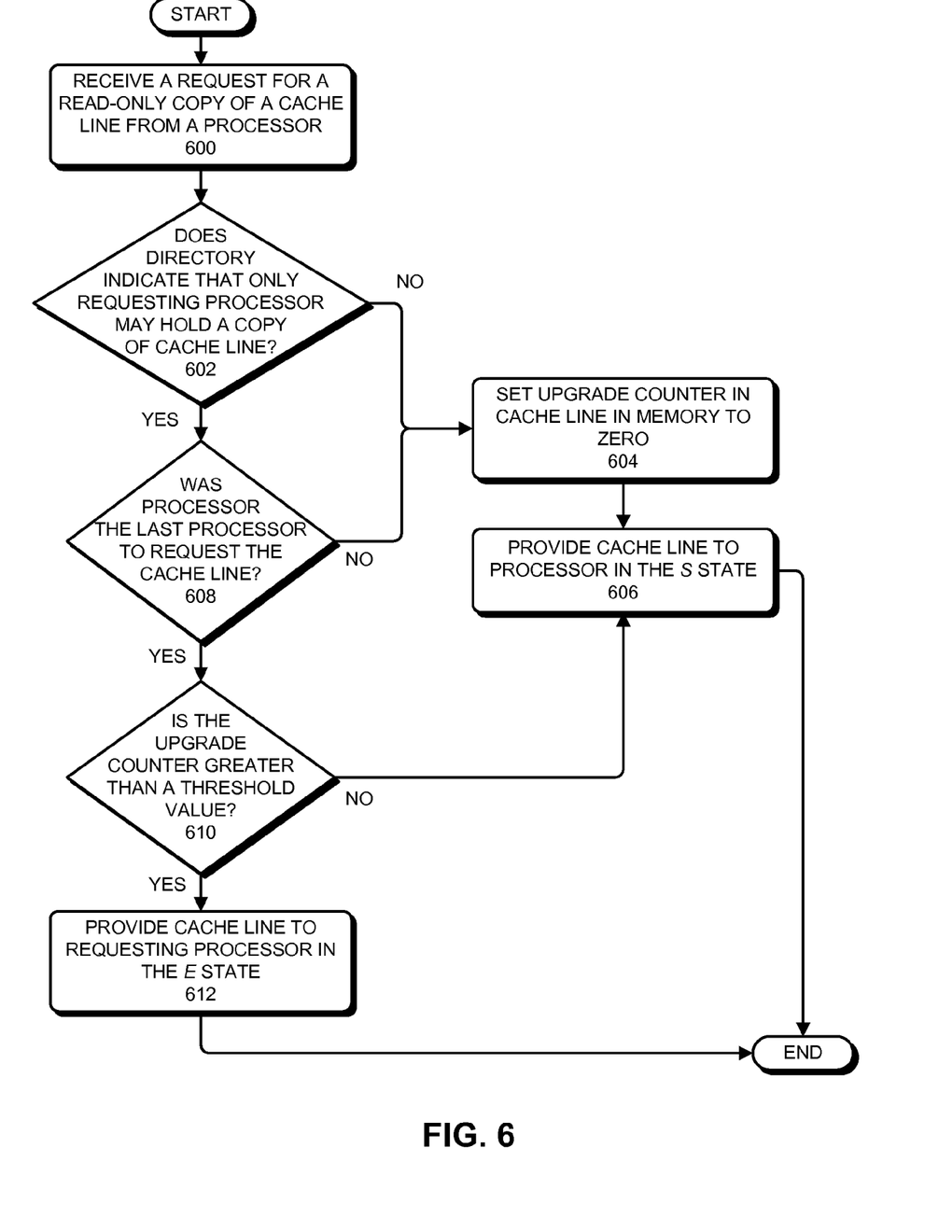
FIG. 6 presents a flowchart illustrating a process for dynamically privatizing a cache line in accordance with embodiments of the present invention.

The following section presents a description of three exemplary processes involved with dynamically privatizing cache lines, which are illustrated in FIGS. 4-6. More specifically, FIG. 4 illustrates a process of adjusting an upgrade counter in accordance with embodiments of the present invention; FIG. 5 illustrates a process for updating a last-user pointer in accordance with embodiments of the present invention; and FIG. 6 illustrates a process for dynamically privatizing a cache line in accordance with embodiments of the present invention.

As mentioned above, FIG. 4 presents a flowchart illustrating a process of adjusting an upgrade counter in accordance with embodiments of the present invention. Recall that a corresponding upgrade counter is stored in metadata 202 in each cache line in computer system 100. The upgrade counter is used by directory 112 to keep track of which cache lines have been privately requested in order to enable dynamic privatization.

The process shown in FIG. 4 starts when directory 112 receives a request for a copy of a cache line in the M state from a processor (step 400). Directory 112 then determines if the record for the cache line in directory 112 indicates that only the requesting processor may hold a copy of the cache line (step 402).

If the cache line may be held by another processor, directory 112 sets an upgrade counter in metadata in the cache line in memory 108 to zero (step 406). Directory 112 then provides a copy of the cache line to the requesting processor 102 in the M state (step 408). In some embodiments of the present invention, providing the copy of the cache line to the requesting processor 102 in the M state involves causing the other processors in the system to invalidate their shared copies of the cache line, providing the copy of the cache line from memory 108 to the requesting processor 102, and then invalidating the copy in memory so that the requesting processor 102 holds the only copy of the cache line.

Note that because another processor holds the cache line, the cache line is not being "privately requested," and hence directory 112 zeroes the upgrade counter in metadata 202 for the cache line before the copy of the cache line is provided to processor 102 to record that the cache line is not being privately requested.

Otherwise, if the only copy of the cache line is recorded as being held by the requesting processor 102, directory 112 increments the upgrade counter in the copy of the cache line in memory 108 (step 404). Directory 112 next provides a copy of the cache line to the requesting processor 102 in the M state (step 408). Upon providing the cache line, including metadata 202 with the updated upgrade counter, directory 112 invalidates the copy of the cache line in memory 108 so that processor 102 holds the only copy of the cache line.

Note that receiving a request to upgrade a cache line from the S state to the M state when there are no other sharers constitutes the "private request" described above. Thus, incrementing the upgrade counter enables the processor 102 to keep track of the private requests that have occurred for the cache line. In addition, note that the upgrade counter is included in metadata 202 in the cache line, so that when the cache line is evicted from L1 cache 104 in processor 102, the updated upgrade counter is carried along with the cache line.

FIG. 5 presents a flowchart illustrating a process for updating a last-user pointer 316 in accordance with embodiments of the present invention. Generally, the last-user pointer 316 is a pointer that contains the identity of the last processor 102 to have held a modified (i.e., M state or "dirty") copy of a corresponding cache line. The last-user pointer 316 is updated when a modified copy of the cache line is evicted from a last processor in which the cache line was present. More specifically, the last user pointer 316 is updated when the dirty copy of the cache line is written back to memory 108. In some embodiments, the last-user pointer 316 is held in a corresponding entry 300 in directory 112. In alternative embodiments, the last-user pointer 316 is held in another location (e.g., metadata 202 in the cache line). For clarity, we describe the embodiments where the last-user pointer 316 is contained in a directory entry 300. However, other embodiments function in a similar way.

The process in FIG. 5 starts when a dirty copy of a cache line is evicted from an L1 cache 104 in a processor 102 and written back to memory 108 (step 500). Directory 112 then updates a corresponding directory entry 300 to indicate that the cache line was last held in the M state in the processor 102 from which the cache line was evicted (step 502). Updating the directory entry 300 involves updating the last-user pointer 316 in the directory entry 300 to indicate the cache from which the cache line was evicted. Note that updating the directory entry can also involve updating other fields in the entry 300 (e.g., the TY 312 field and the ST 314 field).

FIG. 6 presents a flowchart illustrating a process for dynamically privatizing a cache line in accordance with embodiments of the present invention. Note that dynamically privatizing generally involves detecting that a cache line has been privately requested a predetermined number of times by the same processor and subsequently providing the cache line to that processor in the E state (instead of providing the cache line in the S state).

The process shown in FIG. 6 starts when directory 112 receives a request for a read-only copy of a cache line from a processor 102 (step 600). Recall from the description of the MESI protocol above that providing a read-only copy of the cache line can involve providing the cache line in either the S state or the E state. Embodiments of the present invention provide cache lines in the S state until directory 112 determines that the cache line should be privatized, (using the process described in the following paragraphs) and then subsequently provide cache lines to the processor 102 in the E state.

Note that for the purposes of illustration, in FIG. 6, we assume that the cache line is initially either shared by another processor 102 or invalid (i.e., in the S state or the I state, respectively). However, in these embodiments, if the cache line is in the M state or the E state, directory 112 handles the request in accordance with the MESI protocol.

Directory 112 then determines if directory 112 indicates that only the requesting processor may hold a copy of the cache line (step 602). If not, the cache line is currently being held in the L1 cache 104 of another processor 102, and the cache line is not being privately requested. Thus, directory 112 sets the upgrade counter in the metadata 202 in the cache line in memory 108 to zero (step 604). Directory 112 then provides the cache line to the requesting processor 102 in the S state (step 606).

If the cache line is not held by another processor, directory 112 determines if the currently requesting processor 102 was the last processor 102 to request the cache line (step 608). In embodiments of the present invention, directory 112 determines the identity of the last processor 102 to request the cache line from last-user pointer 316 in the corresponding entry 300 for the cache line in directory 112. If the requesting processor 102 is not the processor indicated by last-user pointer 316, the cache line is currently being requested by a different processor 102, and the cache line is not being privately requested. Thus, directory 112 sets the upgrade counter in the cache line to zero (step 604). Directory 112 then provides the cache line to the requesting processor 102 in the S state (step 606).

If the requesting processor 102 was the last processor 102 to request the cache line, directory 112 determines if the value in the upgrade counter in the copy of the cache line in memory 108 is greater than a threshold value (step 610). If not, directory 112 provides the cache line to the requesting processor 102 in the S state (step 606). Note that as part of the process of providing the cache line to the requesting processor 102 in the read-only state, directory 112 sends out a message to cause any processor 102 that holds a copy of the cache line in the M state to forward the modified cache line to memory 108 and remove access rights (i.e., read permission) from the modifying processor 102's copy of the cache line. In this way, directory 112 always has the latest version of the upgrade counter in the cache line in memory 108 before making the determination about whether the value in the upgrade counter in the copy of the cache line in memory 108 is greater than a threshold value.

If the value in the upgrade counter in the cache line in memory 108 is greater than a threshold value, a sufficient number of private requests have occurred for embodiments of the present invention to determine that the cache line is being privately requested by the requesting processor 102. Because providing the cache line in the E state to such a processor reduces the latency and the bandwidth consumed by the processor 102 in communicating with directory 112, directory 112 provides the cache line to the requesting processor 102 in the E state (step 612).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for maintaining the coherence of cache lines in a computer system using dynamic privatization, comprising:
   receiving a request for a read-only copy of a cache line from a processor;
   determining if the processor has privately requested the cache line a predetermined number of times; and
   if so, providing a copy of the cache line to the processor in an exclusive state;
   otherwise, providing a copy of the cache line to the processor in a shared state.

2. The method of claim 1, wherein determining if the processor has privately requested the cache line involves:
   determining if the processor has:
   received a copy of the cache line in the shared state; and
   upgraded the copy of the cache line from the shared state to a modified state; and
   determining that no other processor has requested a copy of the cache line between when the cache line was received by the processor and upgraded by the processor.

3. The method of claim 1, wherein the method further comprises:
   receiving a request from a processor for a copy of a cache line in a writable state; and
   determining if the processor holds an only copy of the cache line in the shared state;
   if so, incrementing an upgrade counter in metadata in the cache line and providing a copy of the cache line to the requesting processor in a modified state;
   otherwise, reducing the upgrade counter for the cache line and providing a copy of the cache line to the requesting processor in the modified state.

4. The method of claim 3, wherein upon evicting a modified copy of a cache line from a processor that is an only processor that holds a copy of the cache line and writing the cache line back to a memory, the method further comprises updating a last-user pointer for the cache line to identify the processor as a last processor to request the cache line.

5. The method of claim 4, wherein determining if the processor has privately requested the cache line the predetermined number of times involves:
   determining if the cache line is held by another processor in the shared state;
   if the cache line is held by another processor, reducing the upgrade counter for the cache line and determining that the processor is not privately requesting the cache line;
   otherwise, reading the last-user pointer for the cache line to determine if the processor was the last processor to request the cache line;
   if the processor was not the last processor, reducing the upgrade counter for the cache line and determining that the processor is not privately requesting the cache line;
   otherwise, determining if the value of the upgrade counter is greater than a predetermined threshold value;
   if the value of the upgrade counter is greater, determining that the processor is privately requesting the cache line;
   otherwise, determining that the processor is not privately requesting the cache line.

6. The method of claim 5, wherein reducing the upgrade counter for the cache line involves one of:
   setting the upgrade counter in metadata in the cache line to zero; or
   subtracting a predetermined value from the upgrade counter in metadata in the cache line.

7. The method of claim 1, wherein providing a copy of the cache line to the processor in the shared state involves providing the processor with a read-only copy of a cache line that can be held simultaneously by one or more other processors in the computer system in the shared state; and providing a copy of the cache line to the processor in the exclusive state involves providing the processor with a read-only copy of a cache line that is held by no other processors in the computer system.

8. An apparatus for maintaining the coherence of cache lines in a computer system using dynamic privatization, comprising:
a directory, wherein the directory is configured to:
receive a request for a read-only copy of a cache line from a processor;
determine if the processor has privately requested the cache line a predetermined number of times; and
if so, provide a copy of the cache line to the processor in an exclusive state;
otherwise, provide a copy of the cache line to the processor in a shared state.

9. The apparatus of claim 8, wherein determining if the processor has privately requested the cache line involves:
determining if the processor has:
received a copy of the cache line in the shared state; and
upgraded the copy of the cache line from the shared state to a modified state; and
determining that no other processor has requested a copy of the cache line between when the cache line was received by the processor and upgraded by the processor.

10. The apparatus of claim 8, wherein the directory is configured to:
receive a request from a processor for a copy of a cache line in a writable state; and
determine if the processor holds an only copy of the cache line in the shared state;
if so, increment an upgrade counter in metadata in the cache line and provide a copy of the cache line to the requesting processor in a modified state;
otherwise, reduce the upgrade counter for the cache line and provide a copy of the cache line to the requesting processor in the modified state.

11. The apparatus of claim 10, wherein upon evicting a modified copy of a cache line from a processor that is an only processor that holds a copy of the cache line and writing the cache line back to a memory, the directory is configured to update a last-user pointer for the cache line to identify the processor as a last processor to request the cache line.

12. The apparatus of claim 11, wherein when determining if the processor has privately requested the cache line predetermined number of times, the apparatus is configured to:
determine if the cache line is held by another processor in the shared state;
if the cache line is held by another processor, the directory is configured to reduce the upgrade counter for the cache line and determine that the processor is not privately requesting the cache line;
otherwise, the directory is configured to read the last-user pointer for the cache line to determine if the processor was the last processor to request the cache line;
if the processor was not the last processor, the directory is configured to reduce the upgrade counter for the cache line and determine that the processor is not privately requesting the cache line;
otherwise, the directory is configured to determine if the value of the upgrade counter is greater than a predetermined threshold value;
if the value of the upgrade counter is greater, the directory is configured to determine that the processor is privately requesting the cache line;
otherwise, the directory is configured to determine that the processor is not privately requesting the cache line.

13. The apparatus of claim 12, wherein when reducing the upgrade counter for the cache line, the directory is configured to:
set the upgrade counter in metadata in the cache line to zero; or
subtract a predetermined value from the upgrade counter in metadata in the cache line.

14. The apparatus of claim 8, wherein when providing a copy of the cache line to the processor in the shared state, the directory is configured to provide the processor with a read-only copy of a cache line that can be held simultaneously by one or more other processors in the computer system in the shared state; and
wherein when providing a copy of the cache line to the processor in the exclusive state, the directory is configured to provide the processor with a read-only copy of a cache line that is held by no other processors in the computer system.

15. A computer system for maintaining the coherence of cache lines in a computer system using dynamic privatization, comprising:
a processor coupled to a cache memory, wherein the cache memory is configured to store data for the processor;
a directory coupled to the processor and the cache memory, wherein the directory is configured to:
receive a request for a read-only copy of a cache line from the processor;
determine if the processor has privately requested the cache line a predetermined number of times; and
if so, provide a copy of the cache line from the cache to the processor in an exclusive state;
otherwise, provide a copy of the cache line from the cache to the processor in a shared state.

16. The computer system of claim 15, wherein determining if the processor has privately requested the cache line involves:
determining if the processor has:
received a copy of the cache line in the shared state; and
upgraded the copy of the cache line from the shared state to a modified state; and
determining that no other processor has requested a copy of the cache line between when the cache line was received by the processor and upgraded by the processor.

17. The computer system of claim 15, wherein the directory is configured to:
receive a request from a processor for a copy of a cache line in a writable state; and
determine if the processor holds an only copy of the cache line in the shared state;
if so, increment an upgrade counter in metadata in the cache line and provide a copy of the cache line to the requesting processor in the modified state;
otherwise, reduce the upgrade counter for the cache line and provide a copy of the cache line to the requesting processor in the modified state.

18. The computer system of claim 17, wherein upon evicting a modified copy of a cache line from a processor that is an only processor that holds a copy of the cache line and writing the cache line back to a memory, the directory is configured to update a last-user pointer for the cache line to identify the processor as a last processor to request the cache line.

19. The computer system of claim 18, wherein when determining if the processor has privately requested the cache line the predetermined number of times, the apparatus is configured to:

determine if the cache line is held by another processor in the shared state;

if the cache line is held by another processor, the directory is configured to reduce the upgrade counter for the cache line and determine that the processor is not privately requesting the cache line;

otherwise, the directory is configured to read the last-user pointer for the cache line to determine if the processor was the last processor to request the cache line;

if the processor was not the last processor, the directory is configured to reduce the upgrade counter for the cache line and determine that the processor is not privately requesting the cache line;

otherwise, the directory is configured to determine if the value of the upgrade counter is greater than a predetermined threshold value;

if the value of the upgrade counter is greater, the directory is configured to determine that the processor is privately requesting the cache line;

otherwise, the directory is configured to determine that the processor is not privately requesting the cache line.

20. The computer system of claim 19, wherein when reducing the upgrade counter for the cache line, the directory is configured to:

set the upgrade counter in metadata in the cache line to zero; or subtract a predetermined value from the upgrade counter in metadata in the cache line.

* * * * *